United States Patent [19]
Seputis

[11] Patent Number: 6,012,054
[45] Date of Patent: Jan. 4, 2000

[54] DATABASE SYSTEM WITH METHODS FOR PERFORMING COST-BASED ESTIMATES USING SPLINE HISTOGRAMS

[75] Inventor: Edwin Anthony Seputis, Oakland, Calif.

[73] Assignee: Sybase, Inc., Emeryville, Calif.

[21] Appl. No.: 08/956,631

[22] Filed: Oct. 23, 1997

Related U.S. Application Data

[60] Provisional application No. 60/057,408, Aug. 29, 1997.

[51] Int. Cl.⁷ ..................................................... G06F 17/30
[52] U.S. Cl. ...................... 707/3; 707/1; 707/2; 704/267; 704/258; 704/260; 395/500.02; 395/500.03; 395/500.23; 364/474.29; 364/474.31; 364/468.03; 364/474.02
[58] Field of Search .................. 707/3, 1, 2; 364/474.29, 364/474.31, 193, 474.02, 167.09, 468.03; 704/267, 258, 260; 395/500.03, 500.02, 500.23

[56] References Cited

U.S. PATENT DOCUMENTS

| | | | |
|---|---|---|---|
| 4,956,774 | 9/1990 | Shibamiya et al. | 364/200 |
| 5,384,893 | 1/1995 | Hutchins | 704/267 |
| 5,552,995 | 9/1996 | Sebastian | 364/468.03 |
| 5,689,696 | 11/1997 | Gibbons et al. | 707/1 |
| 5,732,107 | 3/1998 | Phillips et al. | 375/296 |
| 5,778,353 | 7/1998 | Schiefer et al. | 707/2 |
| 5,799,311 | 8/1998 | Agrawal et al. | 707/102 |
| 5,822,456 | 10/1998 | Reed et al. | 382/232 |
| 5,838,579 | 11/1998 | Olson et al. | 364/488 |
| 5,903,476 | 5/1999 | Mauskar et al. | 395/500.27 |

OTHER PUBLICATIONS

Poosala, V., Ioannidis, Y., Haas, P., and Shekita, E., "Improved Histograms for Selectivity Estimation of Range Predicates," ACM SIGMOD '96, Montreal, Canada, 1996, pp. 294–305.

Piatetsky–Shapiro, G. and Connell, C., "Accurate Estimation of the Number of Tuples Satisfying A Condition," ACM, 1984, pp. 256–276.

Mannino, M., Chu, P., and Sager, T., "Statistical Profile Estimation in Database Systems," ACM Computing Surveys, vol. 20, No. 3, Sep. 1988, pp. 191–221.

*Primary Examiner*—Anton W. Fetting
*Assistant Examiner*—Jean M. Corrielus
*Attorney, Agent, or Firm*—John A. Smart

[57] ABSTRACT

Database system and methods are described for improving execution speed of database queries (e.g., for decision support) by provides methods employing spline histograms for improving the determination of selectivity estimates. The general approach improves histogram-based cost estimates as follows. The constant associated with a predicate (e.g., in r.a>5, the constant is "5") is used to do a binary search in an array of histogram boundary values, for determining a particular histogram cell. Once a cell has been found, the system employs interpolation to find out how much of the cell has been selected. Once this interpolation value is found, it is used with a cell weighting and a spline value or weighting to estimate the selectivity of the predicate value, which takes into account how data values are distributed within the cell. As a result of increased accuracy of estimates, the system can formulate better query plans and, thus, provides better performance.

32 Claims, 8 Drawing Sheets

6,012,054

DATABASE SYSTEM WITH METHODS FOR PERFORMING COST-BASED ESTIMATES USING SPLINE HISTOGRAMS

RELATED APPLICATIONS

The present application claims the benefit of priority from commonly-owned provisional application Ser. No. 60/057,408, filed Aug. 29, 1997 and now pending, entitled DATABASE SYSTEM WITH METHODS FOR PERFORMING COST-BASED ESTIMATES USING SPLINE HISTOGRAMS, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to improved system performance during retrieval of information stored in a data processing system, such as a Relational Database Management System (RDBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

RDBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase® SQL Server™ database servers. Both Powersoft™ and Sybase® SQL Server™ are available from Sybase, Inc. of Emeryville, Calif. As the migration to client/server systems continues, each day more and more businesses are run from mission-critical systems which store information on server-based SQL database systems, such as Sybase® SQL Server™. As a result, increasingly higher demands are being placed on server-based SQL database systems to provide enterprise-wide decision support—providing timely on-line access to critical business information (e.g., through "queries").

At its core, every RDBMS system includes certain modules which perform basic tasks, including a parser, an optimizer, an execution engine, and a data manager. A parser reads client statements and transforms them into an internal representation. An optimizer takes the internal representation of the statement and looks at several alternative strategies for obtaining the correct response, an "answer" from the underlying database. The choices made by the optimizer have a profound impact on a system's response time for the client. Improper choice, for instance, can delay response time by seconds, minutes, or hours. The job of the optimizer is, therefore, to make the best choice using estimations based on the "cost" of various strategies. The execution engine employs the execution strategy formulated by the optimizer to obtain the correct response and give the results to the client. During operation, the execution engine submits requests to the data manager to obtain information from tables. This is done in a manner that was determined by the optimizer, for instance, using available indices, performing table scans, or the like.

In today's information-based economy, on-line database systems are critical for running the day-to-day operations of a business, whether for decision support or for on-line transaction processing. Accordingly, there has been great interest in the area of improving the speed by which these systems execute database queries. The underlying performance of a database system is closely tied to its optimizer, which, in turn, is closely tied to the cost estimates which the optimizer adopts. Consider, for instance, a cost estimate of an optimizer which inaccurately predicts that a particular operation requires only a few seconds, when in fact the operation takes minutes or hours. This type mistake is often magnified in the context of a complex query, where the particular operation might occur hundreds or thousands of times. The end result of the mistake is unacceptable system performance. If, on the other hand, the accuracy of the estimates of the cost of a particular strategy provided by the optimizer is improved, the predicted performance of the final execution plan will be more accurate. In this case, the result is better performance of the RDBMS system. The system exhibits better throughput and response time for queries, including DSS (Decision Support System) queries.

The cost estimates provided by optimizers in present-day RDBMS systems are not particularly accurate. This results in poor execution plan strategies being selected. Attempts to address the problem have focused on "workarounds" for poor optimizer plan selection. Here, systems allow a DBA (Database Administrator) to explicitly override the optimizer's selection with a "force plan option" or "force index option." Such an approach entails significant disadvantages, however. Overriding an optimizer is a highly-skilled, labor-intensive task and, as a result, a very costly proposition for users of RDBMS systems.

This manual override approach exists in stark contrast to what automation users expect from modern RDBMS systems. One of the main advantages of RDBMS systems is that this type of work should be done automatically. The normal mode of operation is that the optimizer should automatically adjust execution plans given that the data distributions in the RDBMS system changes over time. If explicit overrides need to be specified, then this advantage of an RDBMS system is negated and the costly analysis may need to be repeated over and over again. Further, the option of manually overriding a system's optimizer is often not available to users. A growing part of RDBMS business supports "VAR" (Value-added Retailer) applications, including, for instance, those provided by Peoplesoft™, Siebel™, and Baan™. In these cases, the RDBMS users (i.e., end-user customers) may not even have the ability to use "force" options since only the VAR has the ability to change the application. At the same time, the VARs do not want to make RDBMS vendor specific changes to their application for problems in a particular RDBMS vendor's optimizer. All told, there exists great interest in improving an optimizer's plan selection without requiring users to provide explicit override options.

SUMMARY OF THE INVENTION

The present invention comprises a Client/Server Database System with improved methods for optimizing execution of database queries. In an exemplary embodiment, the system includes one or more Clients (e.g., Terminals or PCs) connected via a Network to a Server. The Server, operating under a server operating system (e.g., UNIX) includes a Database Server System, such as Sybase SQL Server™. In general operation, Clients store data in and retrieve data from one or more database tables resident on the Server by submitting SQL commands, some of which specify "queries'—criteria for selecting particular records of a table.

For enhancing the speed in which the Database Server performs queries, the system provides methods employing spline histograms for improving the determination of selectivity estimates. The general approach improves histogram-based cost estimates as follows. The constant associated with a predicate (e.g., in r.a>5, the constant is "5") is used to do a binary search in an array of histogram boundary values, for determining a particular cell. Once a cell has been found, the system employs interpolation to find out how much of the cell has been selected. Once this interpolation value is found, it is used with a cell weighting and a spline value or weighting to estimate the selectivity of the predicate value. Here, the spline weighting takes into account how data values are distributed within the cell.

Internally, the system provides a "spline estimate" method, st_spline_estimate, which is invoked with three parameters: total, spline, and interpolate. The total parameter reflects the total weight of the selected histogram cell. The spline parameter indicates the positive or negative weighting of the spline. The interpolate parameter is the estimate of the portion of the cell selected, which is previously computed by an interpolate method.

The functionality of the "spline estimate" method is divided according to whether the spline is positive or negative. Selectivity is calculated in the case of a positive spline by adding the uniform component to the spline component. First, the uniform component of selectivity is determined by subtracting the spline value or weighting from the total cell weighting and then multiplying that quantity by the interpolate fraction, as follows.

selectivity=(total−spline)*interpolate;

Now, the method adds to the selectivity value the spline component, which is calculated as the spline weighting multiplied by the interpolate fraction squared.

selectivity+=spline*interpolate*interpolate;

In a similar manner, the calculation for a negative spline also adds the uniform component to the spline component. However in that instance, the uniform component of selectivity is calculated by subtracting the spline weight from the total cell weight and multiplying that value by the interpolate fraction.

selectivity=(total−spline)*interpolate;

To add the spline component, the method first calculates a new interpolate fraction by subtracting the previously-calculated interpolate fraction from the value of 1 as follows.

interpolate=1.0−interpolate;

Now, the selectivity calculation adds the spline component, which is determined by multiplying the spline value by the quantity of 1 minus the interpolate fraction squared, as follows.

selectivity+=spline*(1.0−interpolate*interpolate);

As a result of increased accuracy of estimates, the system can formulate better query plans and, thus, provides better performance.

DETAILED DESCRIPTION OF A PREFERRED EMBODIMENT

The following description will focus on the presently-preferred embodiment of the present invention, which is operative in a network environment executing client/server database applications. The present invention, however, is not limited to any particular application or environment. Instead, those skilled in the art will find that the present invention may be advantageously applied to any application or environment where optimization of query performance is desirable, including non-SQL database management systems and the like. The description of the exemplary embodiments which follows is, therefore, for the purpose of illustration and not limitation.

Standalone System Hardware

Figure 1A:
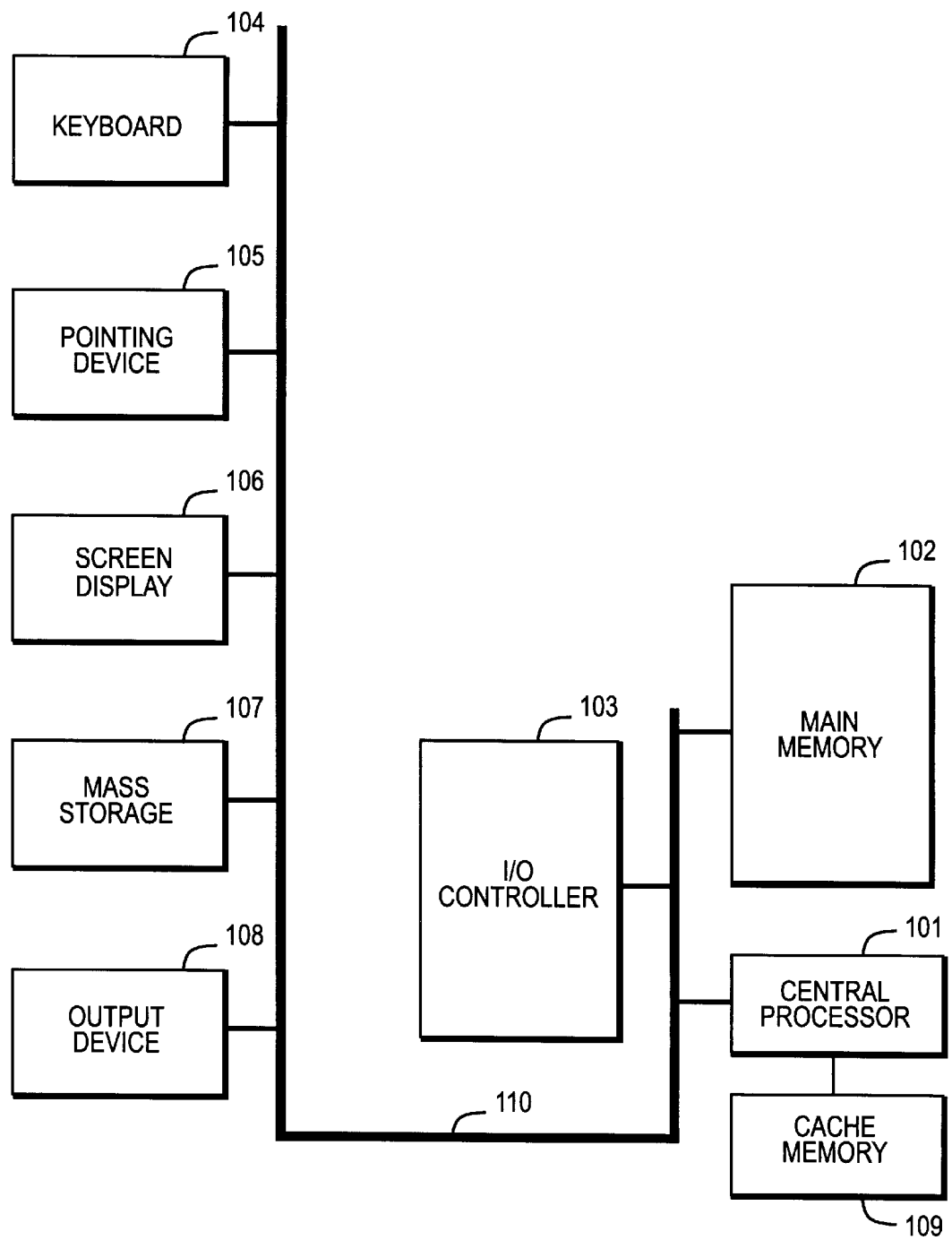
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
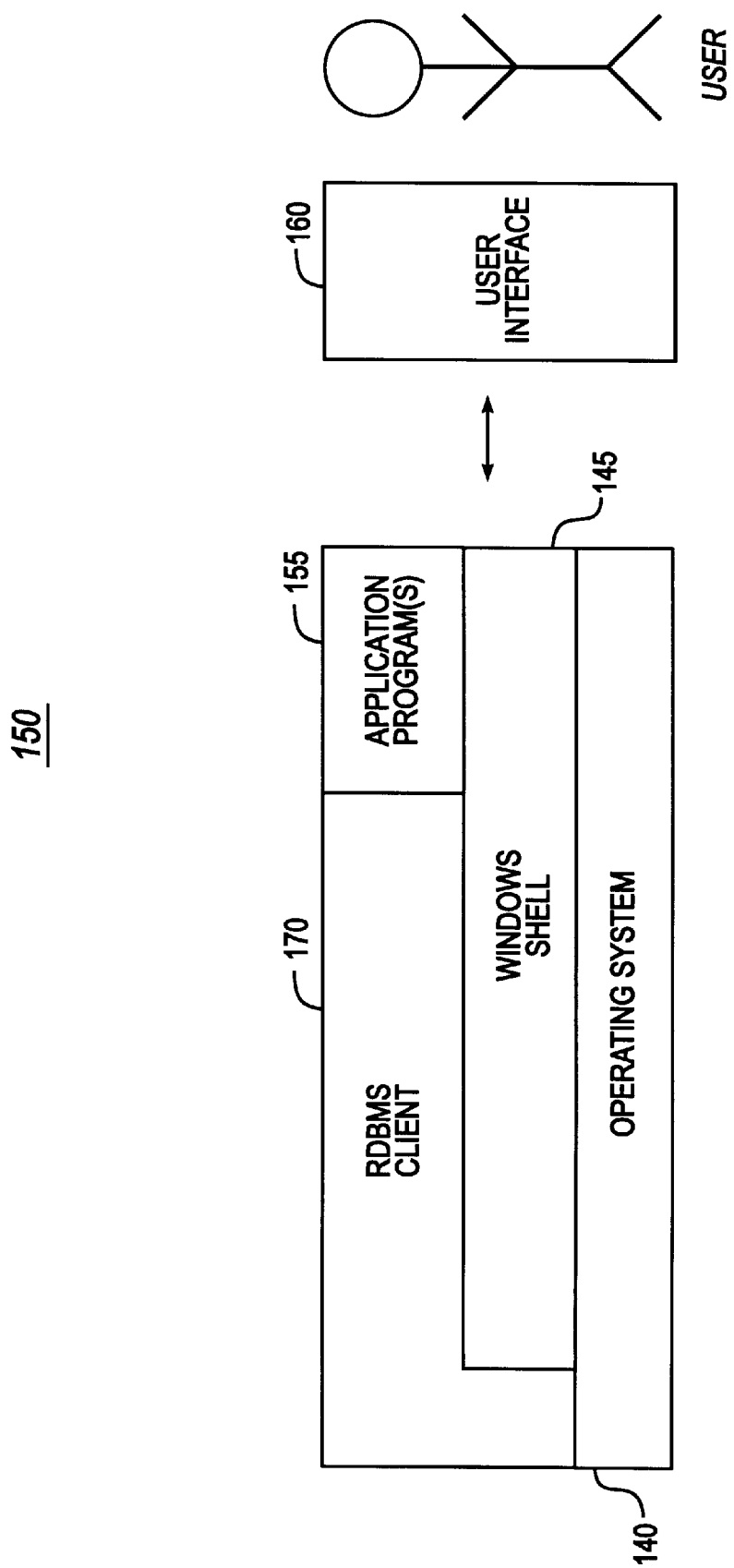
FIG. 1B is a block diagram illustrating a software sub-system for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing SQL database server tables in a Client/Server environment.

Client/Server Database Management System

Figure 2:
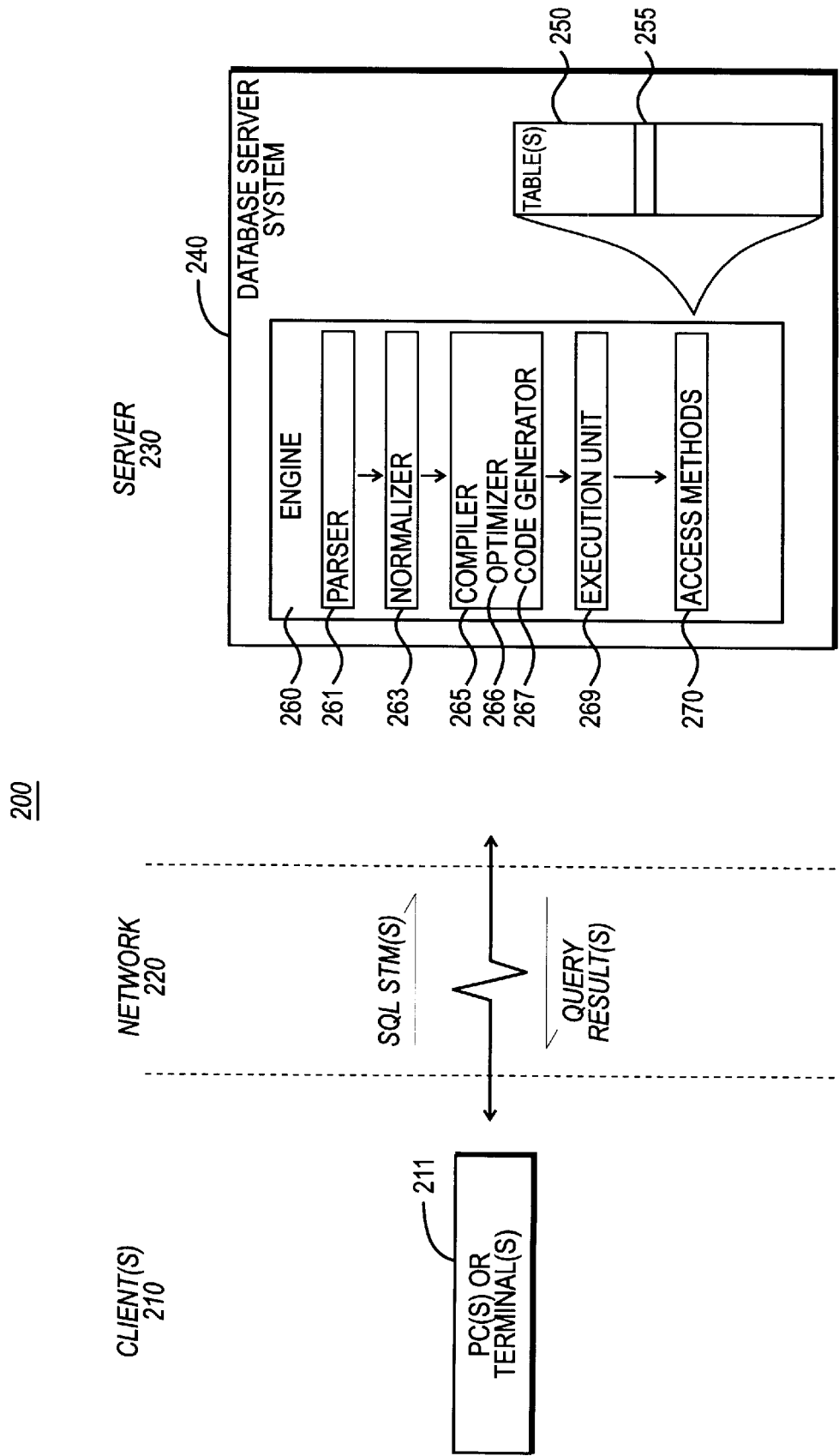
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah.), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server 240.

Client/server environments, database servers, and networks are well documented in the technical, trade, and patent literature. For a discussion of database servers and client/server environments generally and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3. x and 4. x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

Of particular interest to the present invention is enhancing operation of the system's optimizer for improving query execution. Modification of the Engine 260 for effecting this improvement will now be described in further detail.

Improving Query Performance by Implementing a Spline Histogram-based Optimizer

A. Improving Cost Estimates

1. "Normal" histogram

Figure 3:
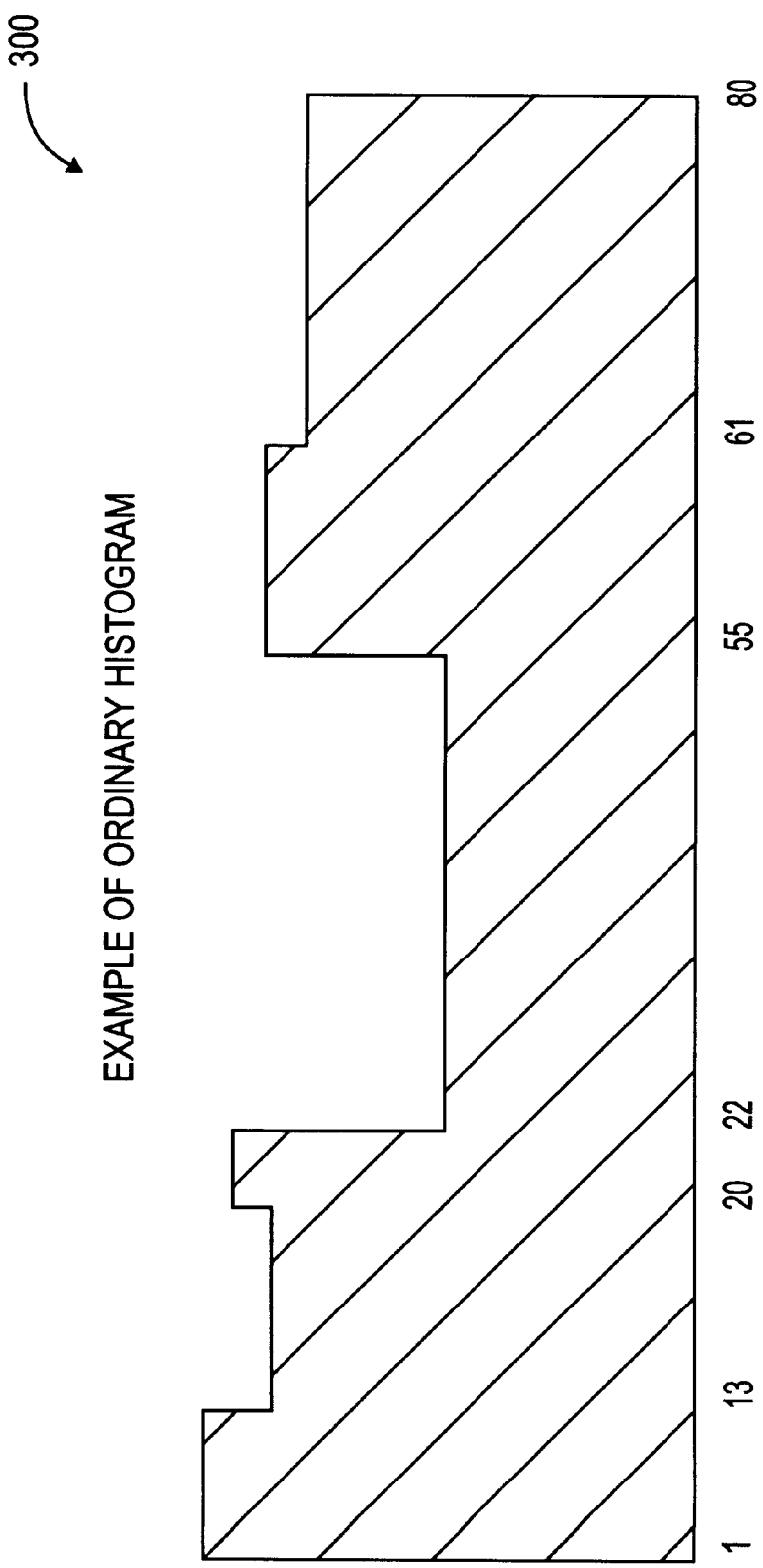
FIG. 3 illustrates an ordinary histogram having values which form specific cell boundaries.

Histograms have been used by most RDBMS vendors to do selectivity estimates, which eventually lead to cost estimates. A histogram is a set of "cells" defined by a lower bound and an upper bound, with an associated weight. Histogram chart 300, shown in FIG. 3, is an example of an ordinary histogram having values which form specific cell boundaries (i.e., rectangles defined by 1, 13, 20, 22, 55, 61, and 80). The size of each rectangle represents the proportion of tuples associated with a cell. This is perhaps best explained by example. Suppose a selectivity estimate is made for the following query, in which the above histogram 300 exists for the attribute "r.b".

select r.a from r where r.b<=23 and r.b>22

Based on the histogram, the optimizer would determine that the number "23" falls within the fourth cell and that the number "22" falls on the lower cell boundary of the fourth cell. Therefore, the selectivity of the where clause includes some fraction of the fourth cell.

A particular problem exists. In particular, the foregoing approach to formulating an estimate assumes that there is uniform distribution of tuples within a given cell. In this example, for instance, such an approach assumes that there are just as many records or tuples having a value of "23" as there are ones having a value of "54" (or other number within the cell). Thus, a proportion of the weight of a cell is estimated based on the uniform distribution assumption. This problem stems from the fact that normal histogram cells only have a single weight associated with each cell to describe that respective cell.

2. "Spline" histogram

Figure 4:
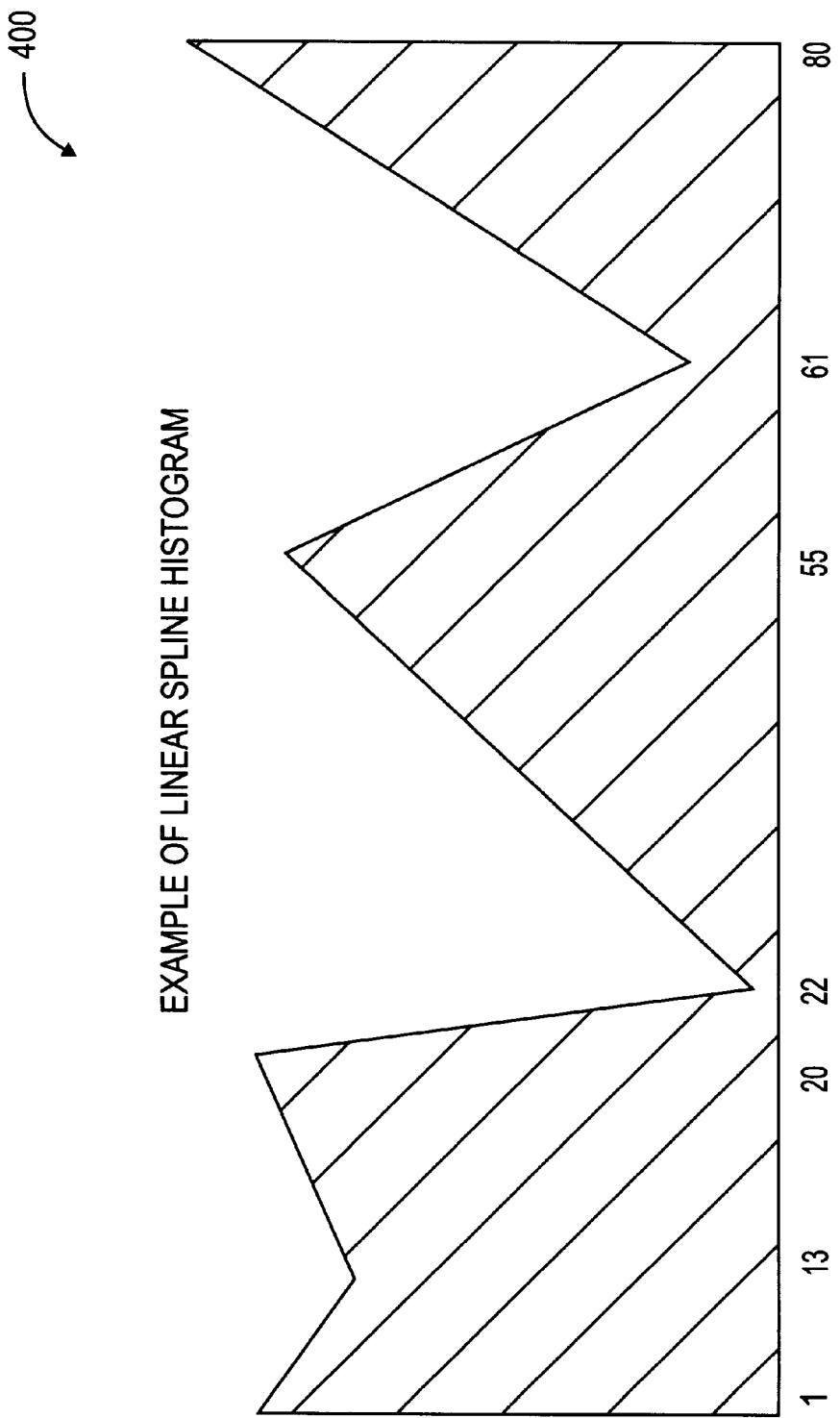
FIG. 4 illustrates a "spline" histogram for more accurately modeling the data set of FIG. 3.

Suppose that the real distribution for the underlying data set is closer to the distribution shown by linear spline histogram chart 400 of FIG. 4. The linear spline histogram 400 is an ordered set of values with floats, much like that of an ordinary histogram, except an extra float is associated with each cell for providing a measure of the linear spline. A "spline" is a measure of the portion of the cell which should be considered non-uniform when trying to interpolate the selectivity of a "range sarg." If a cell has a spline value of zero, then values within the cell are uniformly distributed. If a cell has a spline value greater than zero (i.e., positive spline), then values within the cell are distributed more densely near the end of the cell. If a cell has a spline value less than zero (i.e., negative spline), then values within the cell are distributed more densely near the beginning of the cell. Thus, the addition of a spline value—an extra floating-point value per cell—allows a more accurate selectivity estimate, because the actual distribution of the data within each cell can be more accurately modeled.

Returning to the prior example of "r.a>22 and r.a<=23", the smaller area selected in the linear spline histogram is a more accurate reflection of distribution than the area which would be selected had an ordinary histogram been employed. For the present example, the estimate for the normal histogram is incorrect by two orders of magnitude (i.e., 100 fold). A system whose optimizer employs the normal histogram, based on the incorrect estimation of distribution, runs the risk of selecting a poor query plan. The optimizer might, for instance, select an incorrect index or formulate an incorrect row estimate (affecting the join order). Since the query plan directly affects the response time of the RDBMS system, selection of a poor query plan leads to significantly slower system performance.

3. Storage of a polynomial's area

Extending this concept, an additional floating-point value per cell may be employed to model a quadratic approximation. In fact, any degree, n, of a polynomial can be modeled if n floats are added per cell. In accordance with the present invention, the preferred approach is implemented in a modular fashion so that any level of accuracy can be obtained by building on the existence of the previous degree. This is done by storing, in the respective floating point member, the area contributed by each term of the respective term of the polynomial, as opposed to defining the coefficients of the polynomial. Further, the preferred approach is built on top of the basic concept of a histogram, as opposed to trying to model the entire distribution of data by a more complex single polynomial or probability distribution (which is much more difficult to compute and would require a much higher degree to get an equivalent accuracy result). Thus, a normal histogram can be used for most of the cells. Only in those instances when the data distribution in some cells becomes skewed, do cells need to have spline components added.

4. Use of interpolation

In accordance with the invention, interpolation methodology is employed to estimate the proportion of a histogram cell selected. Note that histograms can be applied to any data type—including integer, float, character string, date/time, money, and the like—with interpolation measuring how much of a cell is selected by the constant. As will be seen, the percentage of this selection of the cell is employed in order to use the percentage as part of the spline histogram formula.

B. Preferred Spline Histogram Methodology

1. Introduction

As previously described, the normal histogram has an assumption that values are uniformly distributed within the range of the lower and upper bound of a cell. Conventionally, optimizers determine the proportion of a cell that is selected using the uniform distribution assumption, and then take the appropriate fraction of the total selectivity of a cell. Consider, for example, a cell characterized as follows.

10<0.20 table rows<=20

The above cell indicates that 20% of the values are uniformly distributed between 10 and 20. Thus, if a sarg such as r.a>16 were to be estimated, since 40% of the cell is selected (i.e., (20-16)/(20-10)=40%), the selectivity for the sarg would be 20%*40%=8%. However, in many cases the distribution is not linear and can be represented more accurately by a piece-wise linear curve fitting algorithm. The alternative to this is to try to compensate by increasing the number of cells employed (i.e., increase the sampling) in an effort to reduce the error in the estimates. Given concomitant memory and processor requirements, however, the approach is not practical.

Figure 5:
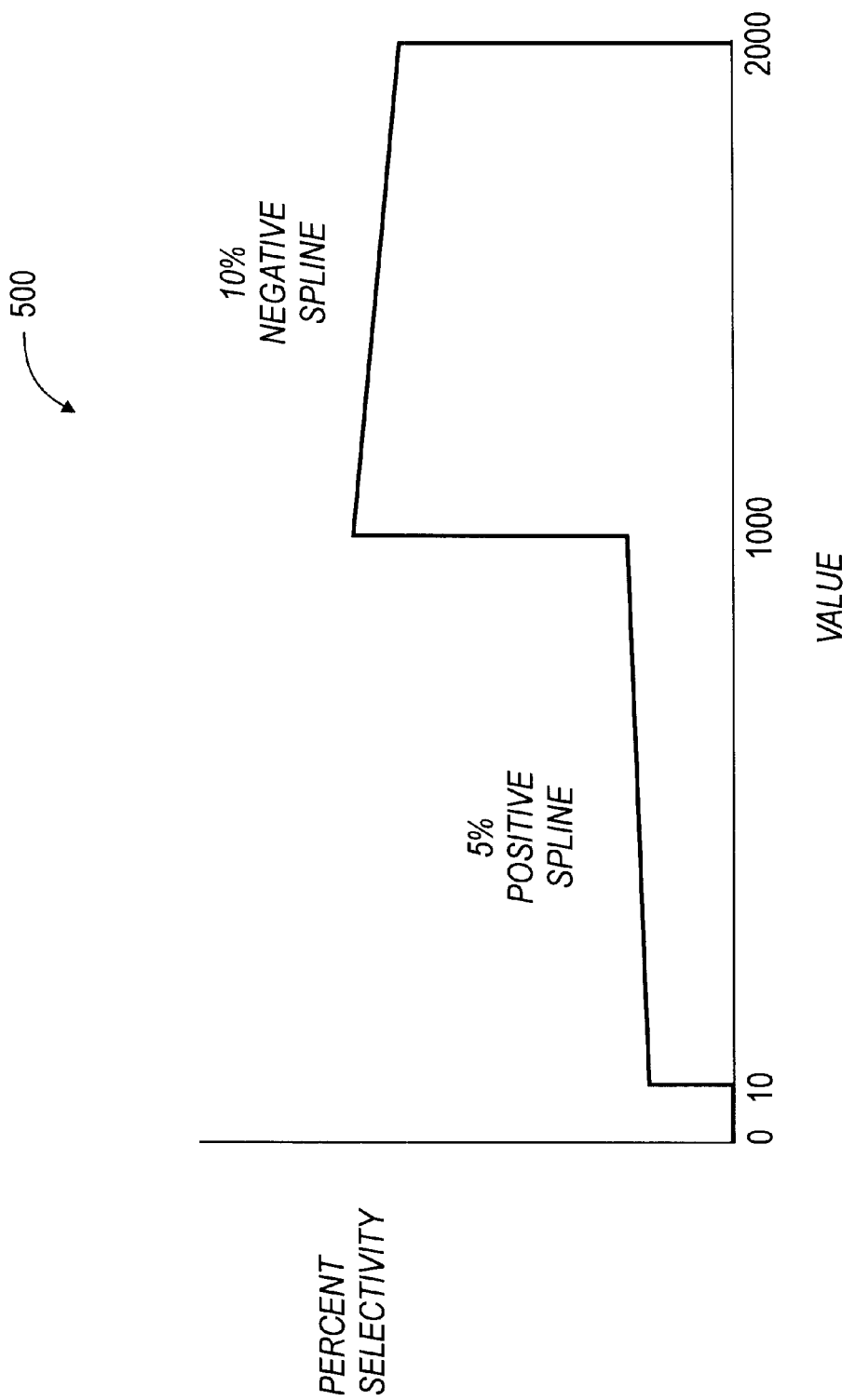
FIG. 5 illustrates how a histogram having three cells is represented internally within the system.

The preferred solution, therefore, is a spline histogram employing not one but two floating-point components, for reflecting the total selectivity of the cell as well as the portion of the cell which is non-uniform. Consider a histogram having three cells, such as histogram 500 shown in FIG. 5. In accordance with the present invention, the histogram (illustrated in exaggerated scale) can be represented by the following list.

| Step no | weight | boundary value | Linear Spline |
|---------|--------|----------------|---------------|
| 1       | 0.0    | 10             | 0.0           |
| 2       | 0.20   | 1000           | 0.05          |
| 3       | 0.80   | 2000           | -0.10         |

The above spline histogram list has components for two cells in which the first one has values between 10 and 1000 which select 20% of the relation and has a positive spline of 5%. The second cell selects 80% of the relation and has a negative spline of -10%. The histogram can be represented in a database by storing values for characterizing each histogram cell. In an exemplary embodiment employing Sybase® SQL Server™, for instance, the information can be stored as three records in the system statistics (SYSSTATISTICS.) table. If desired, the linear spline components can be stored as a separate record.

2. Detailed methodology

Spline-based histograms are useful for modeling data distributions which are typically not uniform within a cell. In cases in which data is totally uniform within a cell, only two step values are required for the distribution, since an interpolation algorithm may be employed to obtain an accurate estimate based on the assumption of uniform distribution. In cases in which the distribution is not uniform, however, there typically is a gradual increase or decrease in the "spacing" of data within the column. In such instances, spline histograms may reduce the "number of steps required," for instance, by an order of magnitude (e.g., from 100 or 200 to 20).

Figure 6:
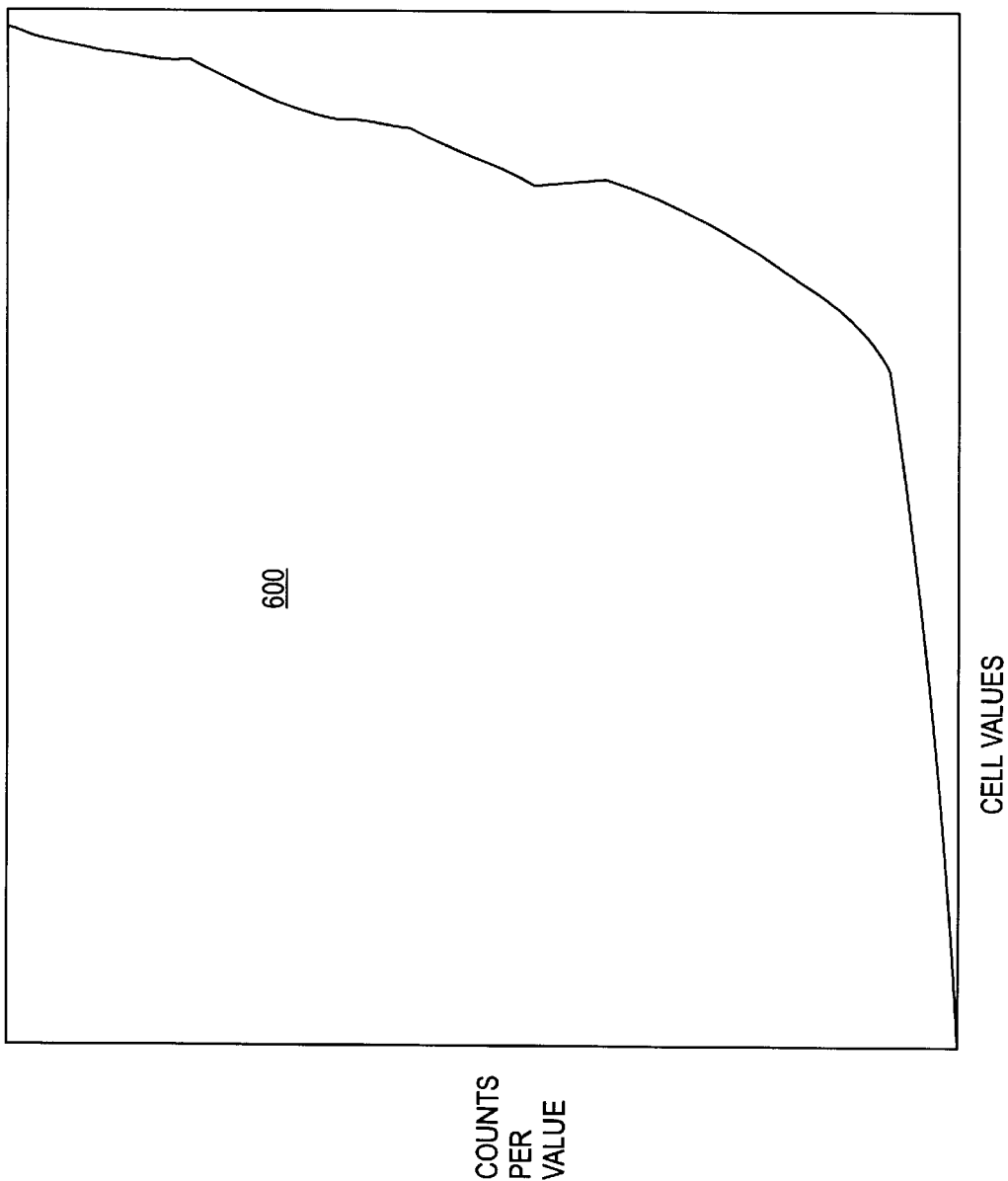
FIG. 6 is a diagram illustrating a histogram cell having a non-uniform distribution of values within the cell, thus leading to inaccurate estimates in systems which assume a uniform distribution of values within each cell.

As previously described, a particular disadvantage of increasing the number of cells to reduce estimation errors is the concomitant dramatic increase in system resources—the amount of disk space, memory resources, and processing—which are required when spline histograms are not employed. Suppose, for example, that data for a particular step 600 is distributed as shown in FIG. 6. Clearly in such a case the assumption of uniform distribution is not accurate: any "<" estimate would probably be too high and any ">" estimate would probably be too low. Here, it would likely be more accurate to estimate this cell with a "positive spline" in which more values are near the end of the cell rather than the beginning. An extremely accurate estimate of a data distribution with fewer steps than a normal histogram can be obtained by applying the methodology of the present invention.

Figure 7:
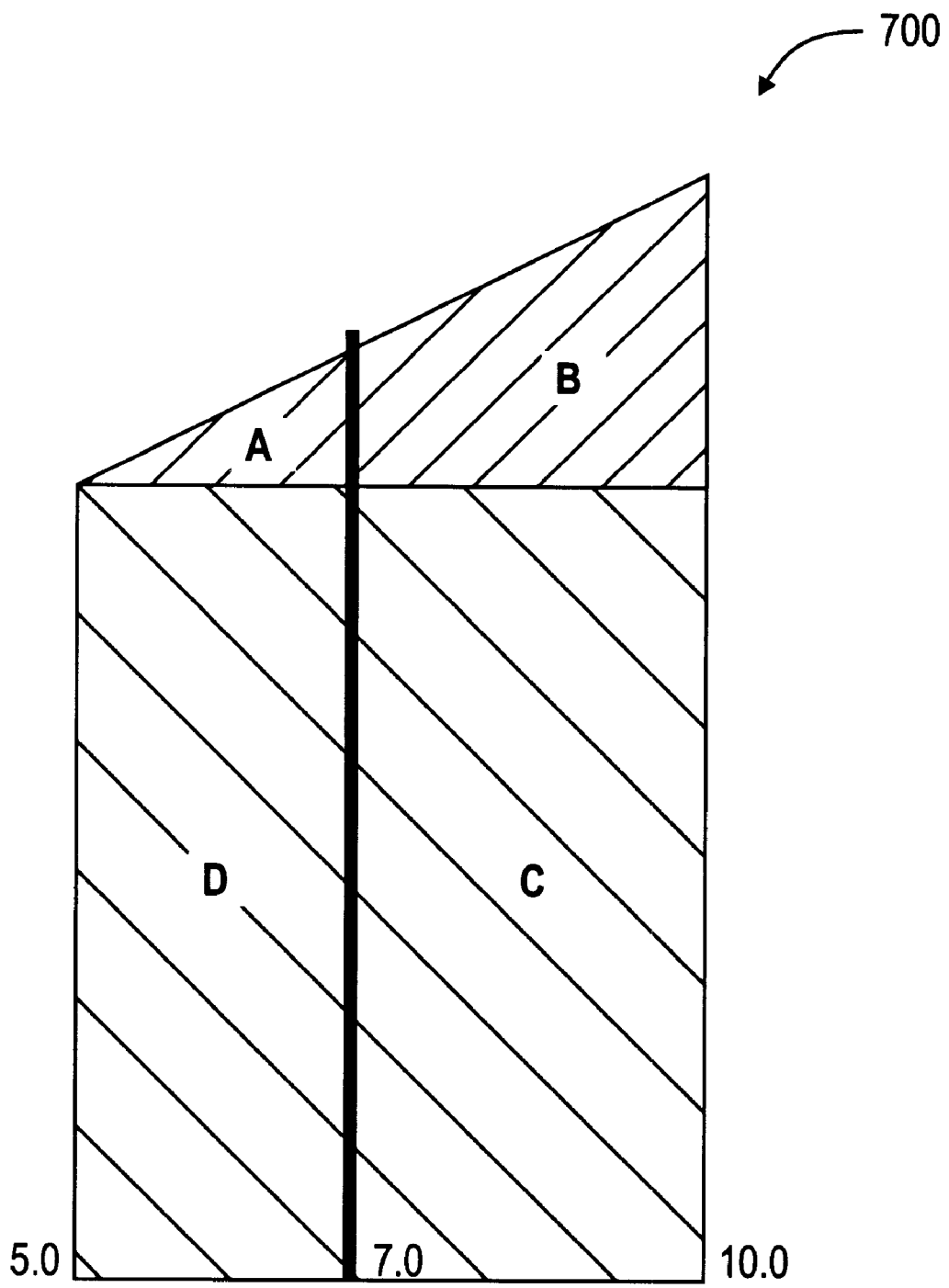
FIG. 7 is a diagram illustrating a histogram cell having a non-uniform distribution of values within the cell which can be accurately modeled by use of a spline component.

Suppose, as another example, that data is distributed within a step 700 as shown in FIG. 7. The figure represents a linear spline for a step with boundary values 5.0 to 10.0. If a normal histogram were employed (i.e., uniform assumption), the sum of the areas of A+B+C+D would be represented by the float between the boundaries of 5.0, 10.0, with the result that the selectivity of the search argument r.a<7.0 would be overestimated. The spline component of the step 700 is represented by the sum of areas of A+B; the uniform component of the above diagram is represented by the sum of areas of C+D. Thus, the absolute value of the spline component added to the uniform component equals the normal histogram component:

ABS (spline component)+uniform component=normal histogram component

Suppose that the sum of the areas of A, B, C, and D are 0.20 (i.e., A+B+C+D=0.20), which is the float stored in a normal histogram. Suppose also that the sum of the areas of A and B are 0.05 (A+B=0.05), which is the float stored in a spline array. Using interpolation, the estimate of "r.a<7" for this cell is (7-5)/(10-5)=0.40. If the spline component were not available, then the estimate for the selectivity of the range search argument in this cell would be 0.08 (calculated as 0.40*0.20=0.08). If the spline is considered then the estimate becomes 0.40 (calculated from (0.40**2)*0.05+(0.20-0.05)*0.40). From calculus, one can determine or integrate the area as a triangle proportional to the square of the x-axis coordinate. In this case, the selectivity of 0.40 is squared to get "area of triangle A." Since everything is proportional, the total area of "A+B=0.05" can be multiplied to get the selectivity of triangle A. The second term is derived by removing the spline component from the total selectivity of the cell, that is (0.20-0.05), to get the uniform component; a uniform distribution is assumed on this remaining component, that is (0.20-0.05)* 0.40.

In order to avoid an extra multiplication step, the computation can be factored to be 0.40*(0.40*0.05+0.20-0.05)= 0.068. The selectivity within a step is, therefore, computationally very simple. Intuitively, if the spline component is large (A+B), then the uniform component (C+D) is small and, thus, would represent a steeper slope in the graph. If the spline component were close to zero, the behavior would be that of a uniform distribution. A spline component which is negative can be represented by a negative sloped line. Note that the histogram cell (i.e., sum of the areas A+B+C+D) always includes the spline component so that the uniform component of a cell (i.e., sum of the areas C+D) is calculated by removing the spline component ((A+B+C+D)−(A+B)). This simplifies the computation by allowing a trivial computation for the total range selectivity: sum all the steps which fall below the selected step in which "r.a<7" fell. Here, only one spline value is used in the selectivity computation per sarg, and this is only used if the sarg constant falls between steps.

3. Source code implementation a. Overview

Methods are provided for determining the selectivity estimate for a histogram. The general approach improves histogram-based cost estimates as follows. The constant associated with a predicate (e.g., in r.a>5, the constant is "5") is used to do a binary search in the array of histogram boundary values, for determining a particular cell. Once a cell has been found, the system employs interpolation to find out how much of the cell has been selected. Once this interpolation value is found, it is used with a cell weighting and a spline value or weighting—which takes into account how data values are distributed within the cell—to estimate the selectivity of the predicate value.

b. Data Structures

At the outset, it is helpful to review core data structures employed when implementing the methodology of the present invention. A first data structure, statistics_rp, is used to read statistics from and write statistics to disk. It may be defined as follows (using the C programming language).

```
/* structure associated with SYSSTATISTICS tuple used to read/write
   statistics from disk */
typedef struct statistics_rp
{
    /* row locked table format */
    uint16 st_crno;      /* row number */
    uint16 st_statbyte;  /* status field */
    uint16 st_eigthyone; /* 81 variable length fields */
    B1MBDEF(SLID, b1senscol)    /* B1 only: sensitivity label */
    B1MBDEF(SLID, b1infocol)    /* B1 only: information label */
    statid_t      st_statid;    /* future expansion */
    objid_t       st_tabid;     /* statistics on this table id */
    sequence_t    st_seqno;     /* sequence number for record */
    DATE          st_moddate;   /* date of last modification */
    formatid_t    st_formatid;  /* formatid of stats record */
    BYTE          st_usedcount; /* number of valid varbinary
                                ** entries in tuple
                                */
    /* beginning of VARBINARY data */
        int16 st_len;                   /* length of row */
        BYTE st_colidarray[MAXKEY];     /* array of colids associated
                                        ** with stats record
                                        */
        union stf_u
        {
            /* - this structure defines the various formats which
            ** can be found in a SYSSTATISTICS row
            ** - fmtrow will understand how to decode the FMT10_COLSTAT
            ** FMT20_SYSTABSTATS and FMT30_PARTITIONS
            ** - FMT11_BOUNDARY and FMT12_WEIGHTS will use the
            ** ptrfmtrow( ) API to fmtrow
            */
            double              st_align;       /* align st_histsteps */
            FMT10_COLSTAT       st_colstat;     /* column statistics descriptor
*/
            FMT11_BOUNDARY      st_histsteps;   /* histogram boundary values */
            FMT12_WEIGHTS       st_weights;     /* histogram weights */
            FMT12_WEIGHTS       st_splines;     /* spline values */
            FMT20_SYSTABSTATS   st_systabstats; /* systabstats snapshot */
            FMT30_PARTITIONS    st_partitions;  /* partition information */
        }stf;
}STATISTICS_RP;
``` where FMT12_WEIGHTS is defined as follows.

```
/* FORMATID 12 - array of weights used for uniform weight component
   and any spline component*/
typedef struct fmt12_weights
{
    weight_t    st_weightarray[MAXSTATVARBINARY];
}FMT12_WEIGHTS;
```

Of interest to the present invention is an array of weights associated with the ordinary histogram and an array of weights which are the spline weights. Use of these values is illustrated later.

Once the foregoing information (including the spline weights) is read from disk, it is stored in in-memory structures used for manipulation. In particular, these structures are optimized for run-time, in-memory use. A "virtual array", which is employed for storing weights/splines, is defined as follows.

```
/* VIRTUAL array - organized as a linked list of array fragments which
** are accessed via a virtual array API, used for weights/splines to
** create a virtual array of values
*/
typedef struct st_virtual
{
    struct st_virtual *st_nextvirtual; /* if list of st_values is
                            ** too large to fit into a page
                            ** then go to next page
                            */
    BYTE     *st_values; /* this will be coerced to an
                            ** array of values, or an array
                            ** of pointers
                            */
}ST_VIRTUAL;
```

A description of the histogram itself, histogram statistics, may be defined as the following data structure.

```
/* HISTOGRAM STATISTICS
*/
typedef struct st_histogram
{
    stepct_t        st_requestedstepct; /* number of weights
    requested */
    stepct_t        st_actualstepct; /* number of weights */
    int32           st_status; /* set of booleans */
#define STHT_PTR 0x00000001L  /* is histogram datatype a PTR */
    ST_STEPS        st_steps;    /* ptr to list of step structs */
```

```
    ST_VIRTUAL      *st_weights;    /* ptr to list of weights
                            ** associated with st_steps
                            */
    ST_VIRTUAL      *st_splines;    /* if non-NULL then a ptr
                            ** to the spline component associated with
                            ** the st_weightp
                            */
}ST_HISTOGRAM;
```

The "requested step count," st_requestedstepct, stores the number of steps (and therefore weights) that the user requested for creating the histogram. The "actual step count," st_actualstepct, stores the actual number used. In the currently-preferred embodiment, the system has a default value of 20, which the user can override on a per table basis. The next data member, st_steps, is a pointer to a list of step structures; this is effectively a virtual array of boundary values. The st_weights data member provides a virtual array of weights (for the ordinary histogram case). Finally, st_splines provides a virtual array of spline weights. With an understanding of these data structures, the internal method steps employed by the currently-preferred embodiment may now be examined.

c. Internal Methods

To determine the percentage of a step selected by a qualification (e.g., query predicate), the system employs an "interpolate" method, STU_INTERPOLATE. The method may be constructed as follows.

```
/*
** STU_INTERPOLATE
**
** Purpose:
**    Determine the percentage of a step selected by a qualification
**    Assumption is that lowerp <= valuep <= upperp. The fraction
determined
**    is logically (valuep - lowerp) / ( upperp - lowerp)
**
** Parameters:
**      datatypep       - ptr to datatype structure of values
**      lowerlen        - length of lower bound value
**      lowerp          - ptr to lower bound value
**      valuelen        - length of value to interpolate
**      valuep          - ptr to value to interpolate
**      upperlen        - length of upper bound value
**      upperp          - ptr to upper bound value
**      charstatp       - ptr to structure of statistical anaiysis
**                        of character positions
**
** Returns
**      0.0 <= value <= 1.0 which represents the percentage
**              selected by a qualification
**
*/
percent_t
stu_interpolate(
        ST_DATAVALUE    *lb_dvp,
        ST_DATAVALUE    *mid_dvp,
        ST_DATAVALUE    *ub_dvp,
        ST_CHARSTAT     *charstatp,
        SYB_BOOLEAN     *estimatep)
{
        length_t        lowerlen;
        BYTE            *lowerp;
        length_t        valuelen;
        BYTE            *valuep;
        length_t        upperlen;
        BYTE            *upperp;
        percent_t       width;      /* estimate of width of cell */
        percent_t       fraction;   /* fraction of cell selected */
        double          ldouble;
        double          vdouble;
```

-continued

```
double              udouble;
datatype_t          left_dt;
datatype_t          right_dt;
*estimatep = TRUE;
lowerlen = lb_dvp->st_vallen;
lowerp = lb_dvp->st_valuep;
valuelen = mid_dvp->st_vallen;
valuep = mid_dvp->st_valuep;
upperlen = ub_dvp->st_vallen;
upperp = ub_dvp->st_valuep;
SYB_ASSERT(lowerlen && upperlen);
if (!valuelen)
{
    fraction = 0.0;
}
else
{
    /* assert that datatype are compatible */
    SYB_ASSERT(    ((left_dt = stu_n_datatype(&lb_dvp->st_dt)) ==
                    (right_dt = stu_n_datatype(&mid_dvp->st_dt)) ||
                    (left_dt == NUME && right_dt == DECML) ||
                    (left_dt == DECML && right_dt == NUME)
                    )
        &&
                   ((left_dt. = stu_n_datatype(&lb_dvp->st_dt)) ==
                    (right_dt = stu_n_datatype(&ub_dvp->st_dt)) ||
                    (left_dt == NUME && right_dt == DECML) ||
                    (left_dt == DECML && right_dt == NUME)
                    )
                   );
SYB ASSERT((ISCSARTYPE(lb_dvp->st_dt.st_datatype))
    ||
    (lb_dvp->st_dt.st_datatype == DT_VARBINARY)
    ||
    (lb_dvp->st_dt.st.datatype == DT_BINARY)
    ||
    (   (lb_dvp->st_dt.st_length ==
        mid_dvp->st_dt.st_length)
         &&
         (lb_dvp->st_dt.st_length
         ub_dvp->st_dt.st_length ))
    );
switch (stu_n_datatype(&lb_dvp->st.dt))
{
    case DT_INT4:
    {
        width =  (double) (*((int32. *)upperp)) -
                 (double) (*((int32 *)lowerp));
        fraction =  ((width <= 0.0) ? 1.0 :
                    ((double) (*((int32 *)valuep)) -
                    (double) (*((int32 *)lowerp)))
                    / width);
        break;
    }
    case DT_INT2:
    {
        width =  (int) (*((int16 *)upperp)) -
                 (int) (*((int16 *)lowerp));
        fraction =  ((width <= 0.0) ? 1.0 :
                    ((int) (*((int16 *)valuep)) -
                    (int) (*((int16 *)lowerp)))
                    / width);
        break;
    }
    case DT_INT1:
    {
        width =  (int) (*((unsigned char *)upperp)) -
                 (int) (*((unsigned char *)lowerp));
        fraction =  ((width <= 0.0) ? 1.0 :
                    ((int) (*((unsigned char *)valuep)) -
                    (int) (*((unsigned char *)lowerp)))
                    / width);
        break;
    }
    case DT_FLT4:
    {
        fraction = stu_doubleinter(*(float *)lowerp,
                     *(float *)valuep,
                     *(float *)upperp);
        break;
```

```
                }
                case DT_FLT8:
                {
                        fraction = stu_doubleinter(*(double *).lowerp,
                                        *(double *)valuep,
                                        *(double *)upperp);
                        break;
                }
                case DT_CHAR:
                case DT_VARCHAR:
                {
                        fraction = stu_bincharinter(' ', charstatp,
                                lowerlen; lowerp,
                                valuelen, valuep,
                                upperlen, upperp);
                        break;
                }
                case DT_BINARY:
                case DT_VARBINARY:
                {
                        fraction = stu_bincharinter((char)0,
                                charstatp,
                                lowerlen, lowerp,
                                valuelen, valuep,
                                upperlen, upperp);
                        break;
                }
                case DT_SHORTMONEY:
                {
                        (void) stu_mny4toflt8(lowerp, &ldouble);
                        (void) stu_mny4toflt8(valuep, &vdouble);
                        (void) stu_mny4tofin8(upperp, &udouble);
                        fraction = stu doubleinter(ldouble,
                                        vdouble, udouble);
                        break;
                }
                case DT_MONEY:
                {
                        (void) com_mnytoflt8(lowerp, lowerlen, (BYTE
*) &ldouble,
                                sizeof(double), 0);
                        (void) com_mnytoflt8(valuep, valuelen, (BYTE
*) &vdouble,
                                sizeof(double), 0);
                        (void) com___mnytoflt8(upperp, upperlen, (BYTE
*) &udouble,
                                sizeof(double), 0);
                        fraction = stu_doubleinter(ldouble,
                                        vdouble, udouble);
                        break;
                }
                case DT_DATETIME:
                {
                        fraction = stu_dateinter((CS_DATETIME *) lowerp,
                                        (CS_DATETIME *)valuep,
                                        (CS DATETIME *)upperp);
                        break,
                }
                case DT_SHORTDATE:
                {
                        fraction = stu_shortdateinter(
                                        (CS_DATETIME4 *)lowerp,
                                        (CS_DATETIME4 *) valuep,
                                        (CS_DATETIME4 *) upperp);
                }
                case DECML:
                case NUME:
                {
                        *estimatep = stu_decimalinter(
                                lb_dvp, mid_dvp, ub_dvp, &fraction);
                        break;
                }
                default:
                {
                        /* return 50% if datatype not supported */
                        *estimatep = FALSE;
                        fraction = 0.5;
                        break;
                }
        }
```

```
            }
            SYB_ASSERT((fraction >= 0.0) && (fraction <= 1.0));
            if (fraction < 0.0)
            {
            fraction = 0.0;
            }
            else if (fraction > 1.0)
            {
        fraction = 1.0;
            }
            return (fraction);
}
```

This method calculates the percentage of a cell selected. This method takes the step value which falls within the cell and then determines the percentage of the cell which has been selected. When the method is invoked, it is passed the lower bound of the cell, the upper bound of the cell, and the actual value (i.e., the predicate value). The parameters can reference any valid data type in the system, including an integer, float, character string, or the like. Based on the particular data type encountered, the method then switches to a particular handler (case arm) for appropriate processing of the data type. In the instance of a data type which is a 4-byte integer (DT_INT4), for instance, the method calculates the width of the cell by subtracting the lower bound value from that of the upper bound value. A fraction can then be calculated by the predicate value divided by the width. The fraction indicates that portion of the cell which is selected (between 0.0 and 1.0). The other case arms or branches function in a similar manner to calculate a fraction for the predicate value which is between 0.0 and 1.0. After ensuring that the calculated fraction is between the acceptable range of 0.0 and 1.0, the method returns the fraction value.

Given a histogram with boundary values and given a predicate value, the system employs a "histogram hit type" method, ST_HIST_HITTYPE, for determining which cell the predicate value falls within. The method may be constructed as follows.

```
/*
**          ST_HIST_HITTYPE
**
**          Calculate the step the sarg is associated with, or other relationship
**          with histogram if no step can be selected. Use binary search and
return
**          HIT_INTERPOLATE if interpolation should be subseguently used, along
with
**          spline histogram estimation. Spline histograms useful when a range
sarg
**          hits a cell with interpolation.
**
**          Parameters:
**              histp - ptr to descriptor of histogram for a column
**              optype - operator type =, !=, >, >=, <, <=, IS NULL
**                  and IS NOT NULL
**              stepnop - step upon which the sarg constant hit
**              dvp - ptr to structure describing the data value
**
**          Returns:
**              hit type - the way in which the sarg fell into the histogram
**                  steps
**
**          Side Effects:
**              None
**
*/
SYB_STATIC hittype_t
st_hist_hittype(
            ST_HISTOCRAM    *histp,
            relop_t         optype,
            ST_DATAVALUE    *dvp,
            stepct_t        *stepnop)
{
            stepct_t        maxstep;        /* number of steps in the histogram */
            stepct_t        lowstep;
            stepct_t        highstep;
            stepct_t        midstep;
            stepct_t        frequency_step;
            ST_VIRTUAL      **virtualpp;
            SYB_BOOLEAN     onstep;
            SYB_BOOLEAN     isptr;
            ST_DATAVALUE    hist_dt;
            SYB_BOOLEAN     compare_result;
```

```
percent_t          selectivity;
hittype_t          hittype;
length_t           cellwidth;
if (!dvp->st_vallen)
{
    return(HIT_NULL);
}
maxstep = histp->st_actualstepct - 1;
if (maxstep <0 1)
{
    /* only one step implies all values are NULL in the histogram
    ** so no rows are selected, since the dvp value is not NULL
    */
    return(HIT_NULLHISTOGRAM);
{
isptr = histp->st_status & STHT_PTR != 0;
virtualpp = &histp->st_steps.st_boundary;
STRUCTASSIGN(histp->st_steps.st_dt, hist_dt.st_dt);
hist_dt.st_vallen = hist_dt.st_dt.st_length;
lowstep = 0;
highstep = maxstep;
midstep = maxstep/2;
onstep = FALSE;
cellwidth = (histp->st_status & STHT_PTR) ?
    sizeof(BYTE *) : hist_dt.st_dt.st_length;
/* binary search to determine where constant falls in step array */
while (lowstep < highstep)
{
    hist_dt.st_valuep = stu_findslot((PROC_HDR *)NULL, virtualpp,
            cellwidth, midstep, maxstep);
    if (isptr)
    {
        /* ptr to a ptr
        ** EARL RESOLVE - assume character string for now
        */
        hist_dt.st valuep = * (BYTE **)hist_dt.st_valuep;
        hist_dt.st_vallen = * (hist_dt.st_valuep++);
    }
    compare_result = stu_compare(&hist_dt, dvp);
    if (onstep)
    {
        /* a previous iteration found that the constant was
        ** on a step boundary so now the check is for a frequency
        ** count cell
        */
        if (!compare result)
        {
            /* frequency count cell has been selected */
            if (midstep == highstep)
            {
                /* frequency_step needs to reference the
                ** higher step value of two equal step
                ** values
                * /
                frequency_step = highstep;
            }
            *stepnop = frequency_step;
            return(HIT_FREQUENCY);
        }
        if (!frequency_step)
        {
            /* since the frequency step fell on the first
            ** boundary, and this first boundary is not a
            ** frequency count cell then by convention the
            ** constant is iess than all values in the
            ** histogram
            */
            return (HIT_UNDERELOW);
        }
        if (midstep > frequency_step)
        {
            /* check to see if the lower step forms a
            ** a frequency count
            */
            mid step = frequency_step - 1;
            continue;
        }
        /* check if the next lower step is part of a dense
        ** sequence of frequency steps, making this a
        ** frequency value otherwise...
```

```
            ** no adjacent steps form a frequency count so this
            ** is a case of a constant falling on the step
            ** boundary of a range cell
            */
            *stepnop = frequency_step;
            return(stu_dense_frequency(&hist_dt, dvp) ?
                HIT_FREQUENCY : HIT_RANGEFREQUENCY);
        }
        if (!compare_result)
        {
            if (midstep == maxstep)
            {
                /* cannot be a frequency cell since only can
                ** occur if lowstep was tested as less than
                *stepnop = midstep;
                return(HIT_RANGEFREQUENCY);
            }
            /* constant value is on a step boundary so check for
            ** a frequency count cell
            */
            onstep = TRUE;
            frequency_step = midstep.;
            if (!midstep)
            {
                highstep = 1;
                midstep = 1;
            }
            else
            {
                highstep = ++midstep;
            }
            continue;
        }
        else if (compare_result > 0)
        {
            if (lowstep == midstep)
            {
                /* no change since last comparison */
                SYB_ASSERT(lowstep == (highstep - 1));
                /* loop once more to check for frequency count
                ** or an overflow_step
                */
                midstep = highstep;
                continue;
            }
            else if (highstep == midstep)
            {
                /* greater than all histgram values */
                SYB_ASSERT(highstep == maxstep);
                return (HIT_OVERFLOW);
            }
            else
            {
                lowstep = midstep;
            }
        }
        else
        {
            if (lowstep == midstep)
            {
                /* constant is less than all steps in
                ** histogram
                */
                SYB_ASSERT (!lowstep);
                return(HIT_UNDERFLOW);
            }
            else if (highstep == midstep)
            {
                /* normal exit for constant which is
                ** lowstep < dvp < highstep
                ** thus interpolation is needed to obtain
                ** the fraction of the cell selected
                */
                break;
            }
            else
            {
                highstep = midstep;
            }
        {
```

```
        midstep = (highstep + lowstep)/2;
    }
    *stepnop = midstep;
    return (HIT_INTERPOLATE);
}
```

The method functions by performing a binary search on all boundary values for determining which cell the predicate value falls within. If the predicate value falls directly on a cell boundary, the method selects the entire cell, thus eliminating the need to interpolate or to employ a spline histogram. Upon conclusion of the binary search, the method returns (by reference) the cell number which the predicate value fell within together with a "hit type"—that is, how the value "hit" the histogram.

In the currently-preferred embodiment, hit types are defined as follows.

```
/* define a set of cases in which the sarg is related to a histogram
** - a histogram is defined by an order set of boundary values, so that in
** order to estimate the selectivity, the predicate constant is in a
** binary search of the histogram values, to see how it hits the histogram
** cell
** - e.g. r.a = 5 is a predicate, in which "5" is the constant, so that
** if a histogram had a "range cell" with lower bound of "1" and upper bound
** of "10" then the hittype_t would be HIT_INTERPOLATE since the predicate
** constant is between two boundary values of a range cell
*/
typedef int32    hittype_t;
#define HIT_FREQUENCY         1    /* boundary value of histogram is
                                   ** equal to predicate constant and
                                   ** moreover, the cell represents a single
                                   ** high frequency domain value
                                   */
#define HIT_OVERFLOW          2    /* predicate constant is higher than
                                   ** all values in the histogram
                                   */
#define HIT_UNDERFLOW         3    /* predicate constant is lower than
                                   ** all values in the histogram
                                   */
#define HIT_NULL              4    /* predicate is IS NULL or IS NOT NULL
                                   */
#define HIT_NULLHISTOGRAM     5    /* histogram has no values except for
                                   ** NULL
                                   */
#define HIT_RANGEFREQUENCY    6    /* predicate constant is equal to the
                                   ** upper bound value of a range cell
                                   */
#define HIT_INTERPOLATE       7    /* predicate constant fall inbetween
                                   ** the upper and lower bounds of a range
                                   ** cell
                                   */
```

For instance, "hit frequency" indicates a hit to a cell which is a single value. Suppose that a hit occurred on a cell having a value of just 17. Here, there is really no upper or lower bound, since the cell stores only a single value. Further, a spline would not be applicable to the cell, as the cell again only stores a single value, not a range. A hit type of "hit underflow" indicates that the predicate value is less than any cell of the histogram, that is, the value is outside the range of the histogram. Of particular interest to the present invention is the hit type of "hit interpolate." This indicates that the value hit the histogram such that the value fell between two boundary values and, thus, the system needs to perform an interpolation (i.e., invoke the interpolate method).

When the system has returned from the binary search method, it has at that point obtained a cell number. From the previously-described virtual arrays, the system can lookup for the cell its associated values (i.e., weight and spline). These values are passed to a "spline estimate" method, st_spline_estimate, which calculates the selectivity of the cell. The method may be constructed as follows.

```
/*
**    ST_SPLINE_ESTIMATE
**
**    Given the interpolation fraction and the spline weight calculate the
**    selectivity of the cell including contribution of the spline
```

-continued

```
**    component.
**
**    Parameters:
**        total         - total weight of cell
**        spline        - spline component of cell
**        interpolate   - percent of cell selected (between 0.0 and
1.0)
**
**    Returns:
**        selectivity of cell and spline component if it exists
**
**    Side Effects:
**        None
**
*/
SYB_STATIC percent_t
```

-continued

```
st_spline_estimate(
    weight_t    total,         // total wt of the cell
    weight_t    spline,        // the positive or neg. wt of the
                               spline
    percent_t   interpolate)   // estimate of cell selected
{
    percent_t   selectivity;
    if (spline >= 0.0)
    {
        /* positive spline */
        /* calculate uniform component */
        selectivity = (total - spline) * interpolate;
        /* add spline component */
        selectivity += spline * interpolate * interpolate;
    }
    else
    {
        /* negative linear spline */
        spline = -spline;       /* get absolute value */
        /* calculate uniform component */
        selectivity = (total - spline) * interpolate;
        /* add spline component */
        interpolate = 1.0 - interpolate;
        selectivity += spline * (1.0 - interpolate * interpolate);
    }
    return (selectivity);
}
```

As shown, the method is invoked with three parameters: total, spline, and interpolate. The total parameter reflects the total weight of the cell. The spline parameter indicates the positive or negative weighting of the spline. The interpolate parameter is the estimate of the portion of the cell selected, which is provided by the interpolate method.

The functionality of the method is divided according to whether the spline is positive or negative. Selectivity is calculated in the case of a positive spline by adding the uniform component to the spline component. First, the uniform component of selectivity is determined by subtracting the spline value or weighting from the total cell weighting and then multiplying that quantity by the interpolate fraction, as follows.

selectivity=(total-spline)*interpolate;

Now, the method adds to the selectivity value the spline component, which is calculated as the spline weighting multiplied by the interpolate fraction squared.

selectivity+=spline*interpolate*interpolate;

In a similar manner, the calculation for a negative spline also adds the uniform component to the spline component. However in that instance, the uniform component of selectivity is calculated by subtracting the spline weight from the total cell weight and multiplying that value by the interpolate fraction.

selectivity=(total-spline)*interpolate;

To add the spline component, the method first calculates a new interpolate fraction by subtracting the previously-calculated interpolate fraction from the value of 1 as follows.

interpolate=1.0-interpolate;

Now, the selectivity calculation adds the spline component, which is determined by multiplying the spline value by the quantity of 1 minus the interpolate fraction squared, as follows.

selectivity+=spline*(1.0-interpolate*interpolate);

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system providing a database storing database objects, a method for improving modeling of cost estimates associated with data access occurring during execution of a database query, the method comprising:

receiving a request to create a histogram for modeling data distribution of a particular database object;

in response to said request, creating a histogram having a plurality of histogram cells for modeling occurrence of values in the database object, each cell being associated with a particular range of values from the particular database object, and each cell having a weighting for indicating how often values in the particular range occur in the database object relative to occurrence of other values in the database object; and for each particular histogram cell, determining selectivity of the cell by:

applying interpolation to the cell for determining a spline weighting indicating how values are actually distributed within the particular range of the cell, and based on the determination, assigning said spline weighting to the cell for indicating how values are distributed within the cell itself.

2. The method of claim 1, wherein each spline weighting assigned to a cell comprises a floating-point quantity.

3. The method of claim 1, wherein a histogram cell is assigned a spline weighting of zero if values within the cell are uniformly distributed.

4. The method of claim 1, further comprising:

receiving a request for access to items of the particular database object having a given value;

based on said given value, determining a particular histogram cell having a particular range which includes the given value; and from the determined particular histogram cell, estimating selectivity of the particular value based on the cell weighting and spline weighting for the cell.

5. The method of claim 4, further comprising:

formulating a query plan for providing access to the particular database object, said query plan including an access strategy based on the estimated selectivity of the given value.

6. The method of claim 1, wherein said database object comprises a database table.

7. The method of claim 1, wherein said database object comprises a database index.

8. The method of claim 1, wherein distribution within a particular cell is modeled as a linear spline by assigning a single spline weighting to the cell.

9. The method of claim 1, wherein distribution within a particular cell is modeled as a quadratic spline by assigning two spline weightings to the cell.

10. The method of claim 1, wherein distribution within a particular cell is modeled as a polynomial of n degree by assigning n number of spline weightings to the cell.

11. The method of claim 1, wherein spline weightings are only assigned to cells determined to have nonuniform distribution.

12. The method of claim 1, wherein values within the histogram are of a single data type.

13. The method of claim 12, wherein said single data type is a data type selected from integer, float, character string, date/time, and money data types.

14. The method of claim 1, wherein each cell's weighting comprises a floating-point value indicating relative selectivity of the cell.

15. The method of claim 1, further comprising:
receiving a query predicate which requires an estimate of selectivity of a given value;
based on said given value, determining a particular histogram cell having a particular range which includes the given value; and
from the determined particular histogram cell, estimating selectivity of the given value.

16. The method of claim 15, wherein said estimating step includes calculating selectivity by:
calculating a uniform component of weighting;
calculating a spline component of weighting; and
calculating selectivity by adding the uniform component to the spline component.

17. The method of claim 16, wherein the uniform component for the particular cell is determined, for a negative spline weighting, by subtracting the spline weighting from the cell weighting and multiplying that value by an interpolate fraction, which indicates what fraction of the cell is selected by the given value.

18. The method of claim 17, wherein the spline component for the particular cell is determined, for a negative spline weighting, by calculating a new interpolate fraction by subtracting the previously-calculated interpolate fraction from the value of 1, and thereafter multiplying the spline weighting by the quantity of 1 minus the interpolate fraction squared.

19. The method of claim 1, wherein said request to create a histogram occurs during conditions when the database object is scanned.

20. In a computer system providing a database storing database objects, a method for improving modeling of cost estimates associated with data access occurring during execution of a database query, the method comprising:
receiving a request to create a histogram for modeling data distribution of a particular database object;
in response to said request, creating a histogram having a plurality of histogram cells for modeling occurrence of values in the database object, each cell being associated with a particular range of values from the particular database object, and each cell having a weighting for indicating how often values in the particular range occur in the database object relative to occurrence of other values in the database object; and
for each particular histogram cell,
determining how values are actually distributed within the particular range of the cell, and
based on the determination, assigning a spline weighting to the cell for indicating how values are distributed within the cell itself,
wherein each range is defined by a lower boundary and an upper boundary, and wherein a histogram cell is assigned a positive spline weighting if values within the cell are distributed more densely near the upper boundary of the particular range for the cell.

21. In a computer system providing a database storing database objects, a method for improving modeling of cost estimates associated with data access occurring during execution of a database query, the method comprising:
receiving a request to create a histogram for modeling data distribution of a particular database object;
in response to said request, creating a histogram having a plurality of histogram cells for modeling occurrence of values in the database object, each cell being associated with a particular range of values from the particular database object, and each cell having a weighting for indicating how often values in the particular range occur in the database object relative to occurrence of other values in the database object; and
for each particular histogram cell,
determining how values are actually distributed within the particular range of the cell, and
based on the determination, assigning a spline weighting to the cell for indicating how values are distributed within the cell itself,
wherein each range is defined by a lower and upper boundary, and wherein a histogram cell is assigned a negative spline weighting if values within the cell are distributed more densely near the lower boundary of the particular range for the cell.

22. In a computer system providing a database storing database objects, a method for improving modeling of cost estimates associated with data access occurring during execution of a database query, the method comprising:
receiving a request to create a histogram for modeling data distribution of a particular database object;
in response to said request, creating a histogram having a plurality of histogram cells for modeling occurrence of values in the database object, each cell being associated with a particular range of values from the particular database object, and each cell having a weighting for indicating how often values in the particular range occur in the database object relative to occurrence of other values in the database object; and
for each particular histogram cell,
determining how values are actually distributed within the particular range of the cell, and
based on the determination, assigning a spline weighting to the cell for indicating how values are distributed within the cell itself,
receiving a query predicate which requires an estimate of selectivity of a given value;
based on said given value, determining a particular histogram cell having a particular range which includes the given value; and
from the determined particular histogram cell, estimating selectivity of the given value, wherein said estimating step includes calculating selectivity by
(i) calculating a uniform component of weighting;
(ii) calculating a spline component of weighting; and
(iii) calculating selectivity by adding the uniform component to the spline component;
wherein the uniform component for the particular cell is determined, for a positive spline weighting, by subtracting the spline weighting from the cell weighting and then multiplying that quantity by an interpolate fraction, which indicates what fraction of the cell is selected by the given value.

23. The method of claim 22, wherein the spline component for the particular cell is determined, for a positive spline weighting, by multiplying the spline weighting by the interpolate fraction squared.

24. A database system providing spline-based cost estimates comprising:

a database storing database objects;

an optimizer which employs a histogram for modeling data distribution of a particular database object;

means for creating a histogram having a plurality of histogram cells for modeling occurrence of values in the database object, each cell being associated with a particular range of values from the particular database object, and each cell having a weighting for indicating how often values in the particular range occur in the database object relative to occurrence of other values in the database object;

means for determining how values are actually distributed within each particular cell by calculating a spline weighting for each particular cell using interpolation; and means for assigning said spline weighting to each particular cell for indicating selectivity of each particular cell based on how values are actually distributed within each particular cell.

25. The system of claim 24, wherein each spline weighting assigned to a cell comprises a floating-point quantity representing a slope of a linear spline.

26. The method of claim 24, further comprising:

query means for receiving a request for access to items of the particular database object having a given value;

means for determining, based on said given value, a particular histogram cell having a particular range which includes the given value; and means for estimating selectivity of the particular value based on the cell weighting and spline weighting for the determined particular histogram cell.

27. The system of claim 26, further comprising:

access means for providing access to the particular database object, said query plan including an access strategy based on the estimated selectivity of the given value.

28. The system of claim 27, wherein said access means provides random access to the particular database object if the selectivity of the given value is estimated to be poor.

29. The system of claim 28, wherein said database object is a database table and said random access includes index-based access to the database table.

30. The system of claim 27, wherein said access means provides sequential access to the particular database object if the selectivity of the given value is estimated to be good.

31. The system of claim 30, wherein said database object is a database table and said sequential access includes scanning the database table.

32. A database system providing spline-based cost estimates comprising:

a database storing database objects;

an optimizer which employs a histogram for modeling data distribution of a particular database object;

means for creating a histogram having a plurality of histogram cells for modeling occurrence of values in the database object, each cell being associated with a particular range of values from the particular database object, and each cell having a weighting for indicating how often values in the particular range occur in the database object relative to occurrence of other values in the database object;

means for determining how values are actually distributed within each particular cell, and means for assigning a spline weighting to each particular cell for indicating how values are actually distributed within each particular cell;

wherein each range is defined by a lower boundary and an upper boundary, and wherein a histogram cell is assigned a positive spline weighting if values within the cell are distributed more densely near the upper boundary of the particular range for the cell and is assigned a negative spline weighting if values within the cell are distributed more densely near the lower boundary of the particular range for the cell.

* * * * *